United States Patent
Chudow

(10) Patent No.: US 7,945,947 B1
(45) Date of Patent: May 17, 2011

(54) METHOD OF PROVIDING A COMPUTER USER WITH HIGH-LEVEL PRIVILEGES

(75) Inventor: Eric B. Chudow, Owings Mills, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 833 days.

(21) Appl. No.: 11/998,913

(22) Filed: Dec. 3, 2007

(51) Int. Cl.
*G06F 21/00* (2006.01)

(52) U.S. Cl. .............................. 726/4; 713/164; 726/22

(58) Field of Classification Search .............. 726/4, 17, 726/21, 22; 713/164, 165, 166
See application file for complete search history.

(56) References Cited

U.S. PATENT DOCUMENTS 5,347,578 A 9/1994 Duxbury

*Primary Examiner* — Gilberto Barron, Jr.
*Assistant Examiner* — Devin Almeida
(74) *Attorney, Agent, or Firm* — Eric Froehlich

(57) ABSTRACT

A method of giving a user high-level access privileges if a combination of keystrokes is sent to a desktop is disclosed. Each terminal services session is enumerated and sessions identified. Unidentified sessions have a user-definable process associated with the session. Desktops registered in the terminal services session are identified, and if a new desktop is identified, a thread is created to attach to that desktop and hook the desktop's low-level keyboard input. The keyboard input is then monitored for a pre-defined combination of keystrokes, and if found, a command shell starts, giving the user higher-level access privileges.

1 Claim, 1 Drawing Sheet

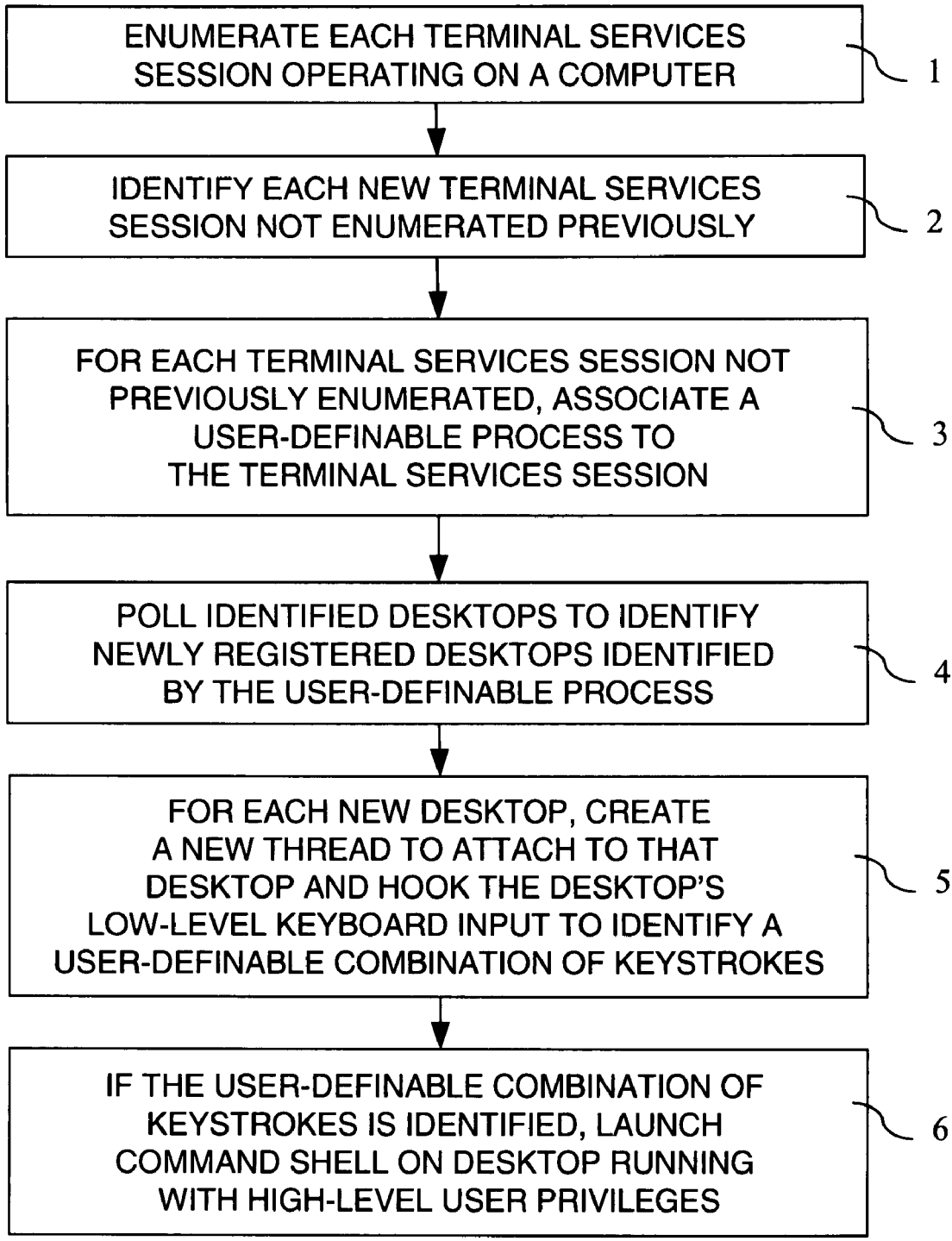

METHOD OF PROVIDING A COMPUTER USER WITH HIGH-LEVEL PRIVILEGES

FIELD OF THE INVENTION

The present invention relates, in general, to computer access, and, in particular to granting users of a computer system a defined level of system privileges.

BACKGROUND OF THE INVENTION

Methods are known in the art that monitor keystrokes, and, if a pre-defined combination of keystrokes is found, triggering a user-definable event. Commonly available prior art programs include:

1. RTMenu's Register Hot Key, which is a free utility that launches a user-definable program at the press of a hot key combination;
2. Google's Desktop Search™, which allows a user the ability to press the Ctrl key twice to open a search window; and
3. Microsoft's Windows® Explorer, which runs by default on a user's main Windows desktop when the user logs in. This program allows a user to press the Windows Key+E combination to open a "My Computer" window, Windows Key+L combination to quickly lock the user's session, Windows Key+D combination to quickly show the user's desktop, and several other key combinations.

In a networked environment, a network administrator typically locks out a user from accessing certain configuration or set-up functions. At times, these lock outs may impact a user's ability to perform needed work, and the user experiences a time delay until the system administrator can either give the user access or performs the work itself. In some systems, even the administrator may not have the requisite access to perform certain privileged functions.

U.S. Pat. No. 5,347,578, entitled "COMPUTER SYSTEM SECURITY," discloses a computer system that prevents users from accessing certain protected resources unless certain conditions are satisfied. The system relies on pre-defined parameters and conditions that must be satisfied before access to protected resources is granted, and requires each condition to include the specified protected resource. The system also dynamically adjusts the group permissions of the user when access is granted to the protected resource. The present invention does not require pre-defined conditions that must be present to grant access to each protected resource or change a user's group permissions. U.S. Pat. No. 5,347,578 is hereby incorporated by reference into the specification of the present invention.

There exists a need to give a user high-level access privileges without having to gather system administrator permission or authentication each time access is needed.

SUMMARY OF THE INVENTION

It is an object of the present invention to monitor all terminal sessions in an operating system, such as Microsoft's Windows® Vista™ operating system, for a special key sequence and if found, launching a command shell running with high privileges for use by the logged-on user, regardless of which user it was and without requiring subsequent authentication.

The first step of the present method is enumerating each terminal services session operating on a computer over a user-selectable time period.

The second step of the present method is identifying each terminal services session that has not been enumerated previously.

In the third step of the present method, for each terminal services session not previously enumerated, a user-definable process is associated to the terminal services session. The user-definable process is selected so that the process can interact with the user connected to that terminal services session and can identify all the desktops registered in the terminal services session that the user-definable process is running in.

The fourth step of the present method is polling the desktops registered in the terminal services session over a user-selectable time period to identify newly registered desktops identifiable by the user-definable process.

In the fifth step of the present method, for each new desktop that the user-definable process has not seen before, a new thread is created to attach to that desktop and hook the desktop's low-level keyboard input. The hook of the desktop's low-level keyboard input is designed to monitor all keystrokes that are sent to the desktop to which the thread is attached and the hook looks for a user-definable combination of at least two keystrokes.

In the sixth, and final, step of the present method, if the user-definable combination of two or more keystrokes is identified, a command shell window is launched on the user's desktop running with high-level user privileges, which gives the user higher privileges to access or modify the computer.

BRIEF DESCRIPTION OF THE DRAWING

A flowchart of steps of the present invention is shown.

DETAILED DESCRIPTION OF THE INVENTION

The present invention monitors all terminal sessions in an operating system, such as Microsoft's Windows Vista, for a special key sequence and if found, launches a command shell running with high privileges for use by the logged-on user, regardless of which user it was and without requiring subsequent authentication.

The advantage of the present method is that it allows any user to launch a command shell with high privileges even though the user may only have few privileges, and does not require a login with a username and password to be entered each time.

In Windows Vista, there is no built-in utility or command that can be used to launch a command shell running with high-privileges as LocalSystem for interactive use by the user. The present invention solves this problem in Windows Vista or similar operating systems.

A similar function exists in Windows® XP, the "at" command, but the user needs to be an administrator and use the "at" command for use at a particular time, instead of on-demand. The present invention overcomes these limitations.

The present method will be described and examples provided using the Windows Vista operating system. The use of Windows Vista is merely to provide an example of one application of the present invention and is not meant to be limiting.

A flowchart of the steps of the present invention.

The first step 1 of the present method is enumerating each terminal services session operating on a computer over a user-selectable time period.

The second step 2 of the present method is identifying each terminal services session that has not been enumerated previously. For example, using the Windows Terminal Services (WTS) API, the Windows Vista system prompt service can programmatically enumerate all open terminal services sessions in Windows. The service polls the list of terminal services session using this API every few seconds, and if the list contains any new sessions that were not previously identified, the service knows that a new session has been created.

In the third step 3 of the present method, for each terminal services session not previously enumerated, a user-definable process is associated to the terminal services session. The user-definable process is selected so that the process can interact with the user connected to that terminal services session and can identify all the desktops registered in the terminal services session that the user-definable process is running in.

The user-definable process, such as a program or application, must be associated with a terminal services session. Once the process has started executing, it cannot change which session it is associated with, and in order for a process to interact with logical desktops that are in one session, it must be associated with that same session. The Vista system prompt service cannot change which session it is associated with, therefore it has to create a new process and associate that process with a different session (via changing the Session ID property in the new process' primary token) in order to interact through this new process with desktops in a different session.

The fourth step 4 of the present method is polling the identified desktops registered in the terminal services session over a user-selectable time period to identify newly registered desktops identifiable by the user-definable process.

Using Windows Vista as an example, using the public Win32 API, each process that is part of the Vista system prompt service can programmatically enumerate all the desktops within the terminal services session that the process is associated with. Each user-definable process polls the list of desktops within its session every few seconds, and if a desktop is found, it knows that a new desktop was created in the intervening period of time.

In the fifth step 5 of the present method, for each new desktop that the user-definable process has not seen before, create a new thread to attach to that desktop and hook the desktop's low-level keyboard input. The hook of the desktop's low-level keyboard input monitors all keystrokes that are sent to the desktop to which the thread is attached, and the hook looks for a user-definable combination of at least two keystrokes.

By way of example, whenever a process that is part of the Vista system prompt service identifies a new desktop within its terminal services session, it uses the public Win32 API to register that it is interested in receiving keystroke events directed to the desktop. It supplies a function to the API for the Windows Win32 subsystem to call whenever a key on the keyboard is pressed so the Vista system prompt service can inspect which keys were pressed.

In the sixth, and final, step 6 of the present method, if the user-definable combination of at least two keystrokes is identified, launch a command shell window on the user's desktop running with high-level user privileges which gives the user higher level privileges to modify or use the computer than the user would ordinarily have.

Again, by example, once a process has registered a low-level keyboard hook on a desktop, it is notified of all keystrokes that occur when the input for the keyboard would go to that desktop. Each Vista system prompt service process examines the keystrokes and if the user-definable key sequence (such as CTRL-F10) was pressed, the system performs the action of creating a command shell running as the LocalSystem account.

While the preferred embodiments of the invention have been illustrated and described, it will be apparent to those of ordinary skill in the art that various changes and modifications may be made without deviating from the inventive concepts set forth above.

What is claimed is:

1. A method of providing high-level privileges to a user of a computer, comprising the steps of: a) enumerating each terminal services session operating on a computer over a user-selectable time period;
   b) identifying each terminal services session that has not been enumerated previously;
   c) for each terminal services session not previously enumerated, associating a user-definable process to the terminal Services session, the user-definable process is selected so that the process can interact with the user connected to that terminal services session and can identify all the desktops registered in the terminal services session that the user-definable process is running in;
   d) polling the identified desktops registered in the terminal services session over a user-selectable time period to identify newly registered desktops identified by the user-definable process;
   e) for each new desktop that the user-definable process has not seen before, create a new thread to attach to that desktop and hook the desktop's low-level keyboard input; wherein the hook of the desktop's low-level keyboard input monitors all keystrokes that are sent to the desktop to which the thread is attached, and the hook looks for a user-definable combination of at least two keystrokes; and
   f) if the user-definable combination of at least two keystroke is identified, launching a command shell window on the user's desktop running with high-level user privileges, the command shell giving the user higher level privileges to modify or use the computer; wherein the command shell window on the user's desktop is running as the Microsoft Windows LocalSystem account.

\* \* \* \* \*